United States Patent
Vo (10) Patent No.: US 7,051,175 B2
(45) Date of Patent: May 23, 2006

(54) TECHNIQUES FOR IMPROVED TRANSACTION PROCESSING

(75) Inventor: Hahn Vo, Houston, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 290 days.

(21) Appl. No.: 10/346,793

(22) Filed: Jan. 17, 2003

(65) Prior Publication Data

US 2004/0143704 A1 Jul. 22, 2004

(51) Int. Cl.
*G06F 12/06* (2006.01)

(52) U.S. Cl. .................. 711/163; 711/156; 711/145
(58) Field of Classification Search ............ 711/154, 711/133, 204, 151, 158, 159, 163, 167, 156, 711/145; 712/205; 710/37
See application file for complete search history.

(56) References Cited

U.S. PATENT DOCUMENTS

| | | | |
|---|---|---|---|
| 5,313,584 A * | 5/1994 | Tickner et al. ................. 710/37 |
| 5,826,052 A * | 10/1998 | Stiles et al. .................. 712/205 |
| 6,226,715 B1 * | 5/2001 | Van Der Wolf et al. .... 711/133 |
| 6,295,586 B1 * | 9/2001 | Novak et al. ................ 711/154 |
| 6,430,654 B1 * | 8/2002 | Mehrotra et al. ........... 711/118 |
| 6,496,917 B1 * | 12/2002 | Cherabuddi et al. ........ 711/204 |
| 2002/0176430 A1 * | 11/2002 | Sangha et al. ............... 370/412 |
| 2004/0088439 A1 * | 5/2004 | Lee et al. .................... 709/250 |

* cited by examiner

*Primary Examiner*—Pierre-Michel Bataille (57) ABSTRACT

Performance improved transaction identification queue structures and techniques for implementing such structures. Specifically, a read queue structure and a dropped queue structure are provided in a host/data controller. Once the read queue structure is filled with read requests, any read requests corresponding to transactions that can be completed without retrieving data from main memory may be moved to the dropped queue structure. The dropped queue structure may provide substitute entrypoints for storage of subsequent read requests.

21 Claims, 4 Drawing Sheets

TECHNIQUES FOR IMPROVED TRANSACTION PROCESSING

BACKGROUND OF THE INVENTION

This section is intended to introduce the reader to various aspects of art which may be related to various aspects of the present invention which are described and/or claimed below. This discussion is believed to be helpful in providing the reader with background information to facilitate a better understanding of the various aspects of the present invention. Accordingly, it should be understood that these statements are to be read in this light, and not as admissions of prior art.

With the advent of standardized architectures and operating systems, computers have become virtually indispensable for a wide variety of uses from business applications to home computing. Whether a computer system is a personal computer or a network of computers connected via a server interface, computers today rely on processors, associated chipsets, and memory chips to perform most of the processing functions, including the processing of system requests. The more complex the system architecture, the more difficult it becomes to process requests in the system efficiently. Despite the increase in complexity of system architectures, demands for improved processing speed continue to drive system design.

Some systems include multiple processor units or microprocessors connected via a processor bus. To coordinate the exchange of information among the processors, a host/data controller is generally provided. The host/data controller may be further tasked with coordinating the exchange of information between a plurality of processors and the system memory. The host/data controller may be responsible not only for the exchange of information in the typical Read Only Memory (ROM) and the Random Access Memory (RAM) but also the cache memory in high speed systems. Cache memory is a special high-speed storage mechanism which may be provided as a reserved section of the main memory or as an independent high speed storage device. The cache memory may be a portion of the RAM that is made of high speed static RAM (SRAM) rather than the slower and cheaper dynamic RAM (DRAM) which may be used for the remainder of the main memory. Alternatively, cache memory may be located in each processor. By storing frequently accessed data and instructions in the cache memory, the system may minimize its access to the slower main memory and thereby may increase the request processing speed in the system.

The host/data controller may be responsible for coordinating the exchange of information among several buses, as well. For example, the host controller may be responsible for coordinating the exchange of information from input/output (I/O) devices via an I/O bus. Further, systems may implement split processor buses wherein the host controller is tasked with exchanging information between the I/O bus and a plurality of processor buses. Due to the complexities of the ever-expanding system architectures which are being introduced in today's computer systems, the task of coordinating the exchange of information becomes increasingly difficult. Because of the increased complexity in the design of the host controller due to the increased complexity of the system architecture, more cycle latency may be disadvantageously injected into cycle time for processing system requests among the I/O devices, processing units, and memory devices which make up the system.

BRIEF DESCRIPTION OF THE DRAWINGS

Advantages of the invention may become apparent upon reading the following detailed description and upon reference to the drawings in which.

DETAILED DESCRIPTION OF SPECIFIC EMBODIMENTS

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
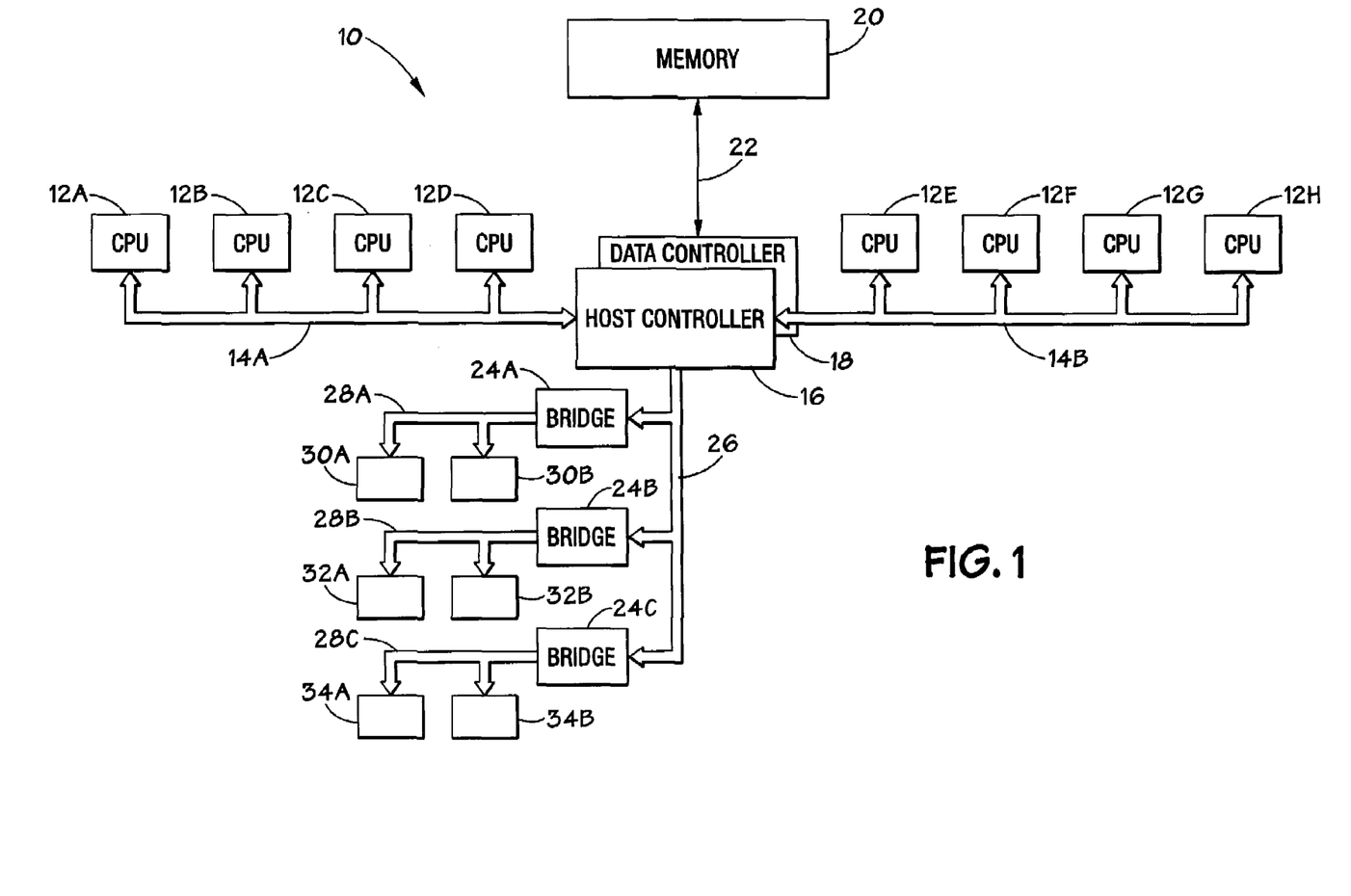
FIG. 1 is a block diagram illustrating an exemplary computer system having a multiple processor bus architecture in accordance with the embodiments of the present invention.

Turning now to the drawings and referring initially to FIG. 1, a block diagram of an exemplary computer system with multiple processor buses and an I/O bus, generally designated as reference numeral 10, is illustrated. The computer system 10 typically includes one or more processors or CPUs. In the exemplary embodiment, the system 10 may utilize eight CPUs 12A–12H. The system 10 may utilize a split-bus configuration in which the CPUs 12A–12D are coupled to a first bus 14A and in which the CPUs 12E–12H are coupled to a second bus 14B. It should be understood that the processors or CPUs 12A–12H may be of any suitable type, such as microprocessors available from Intel, AMD, or Motorola, for example. Each CPU 12A–12H may include a segment of cache memory for storage of frequently accessed data and programs. Furthermore, any suitable bus configuration may be coupled to the CPUs 12A–12H, such as a single bus, a split-bus (as illustrated), or individual buses. By way of example, the exemplary system 10 may utilize Intel Pentium IV processors and the buses 14A and 14B may operate at 100/133 MHz.

Each of the buses 14A and 14B may be coupled to a chip set which includes a host controller 16 and a data controller 18. In this embodiment, the data controller 18 may be a data cross-bar slave device controlled by the host controller 16, for example. The data controller 18 may be used to store data awaiting transfer from one area of the system 10 to a requesting area of the system 10. Because of the master/slave relationship between the host controller 16 and the data controller 18, the chips may be referred to together, herein, as the host/data controller 16, 18.

The host/data controller 16, 18 may be coupled to the main memory 20 via a memory bus 22. The memory 20 may include one or more memory devices, such as dynamic random access memory (DRAM) devices, configured to store data. The memory devices may be configured on one or more memory modules, such as dual inline memory modules (DIMMs). Further, the memory modules may be configured to form a memory array including redundant and/or hot pluggable memory segments. The memory 20 may also include one or more memory controllers (not shown) to coordinate the exchange of requests and data between the memory 20 and a requesting device such as a CPU 12A–12H or I/O device.

The host/data controller 16, 18 is typically coupled to one or more bridges 24A–24C via an Input/Output (I/O) bus 26. The opposite side of each bridge 24A–24C may be coupled to a respective bus 28A–28C, and a plurality of peripheral devices 30A and 30B, 32A and 32B, and 34A and 34B may be coupled to the respective buses 28A, 28B, and 28C. The bridges 24A–24C may be any of a variety of suitable types, such as Peripheral Component Interconnect (PCI), Peripheral Component Interconnect-Extended (PCI-X), Extended Industry Standard Architecture (EISA), Accelerated Graphics Port (AGP), Electronic Data Interchange (ESI), etc. The peripheral devices 30A and 30B, 32A and 32B, and 34A and 34B may include, but are not limited to disk drives, printers, scanners, cd-roms, dvds, monitors, modems, etc.

Figure 2:
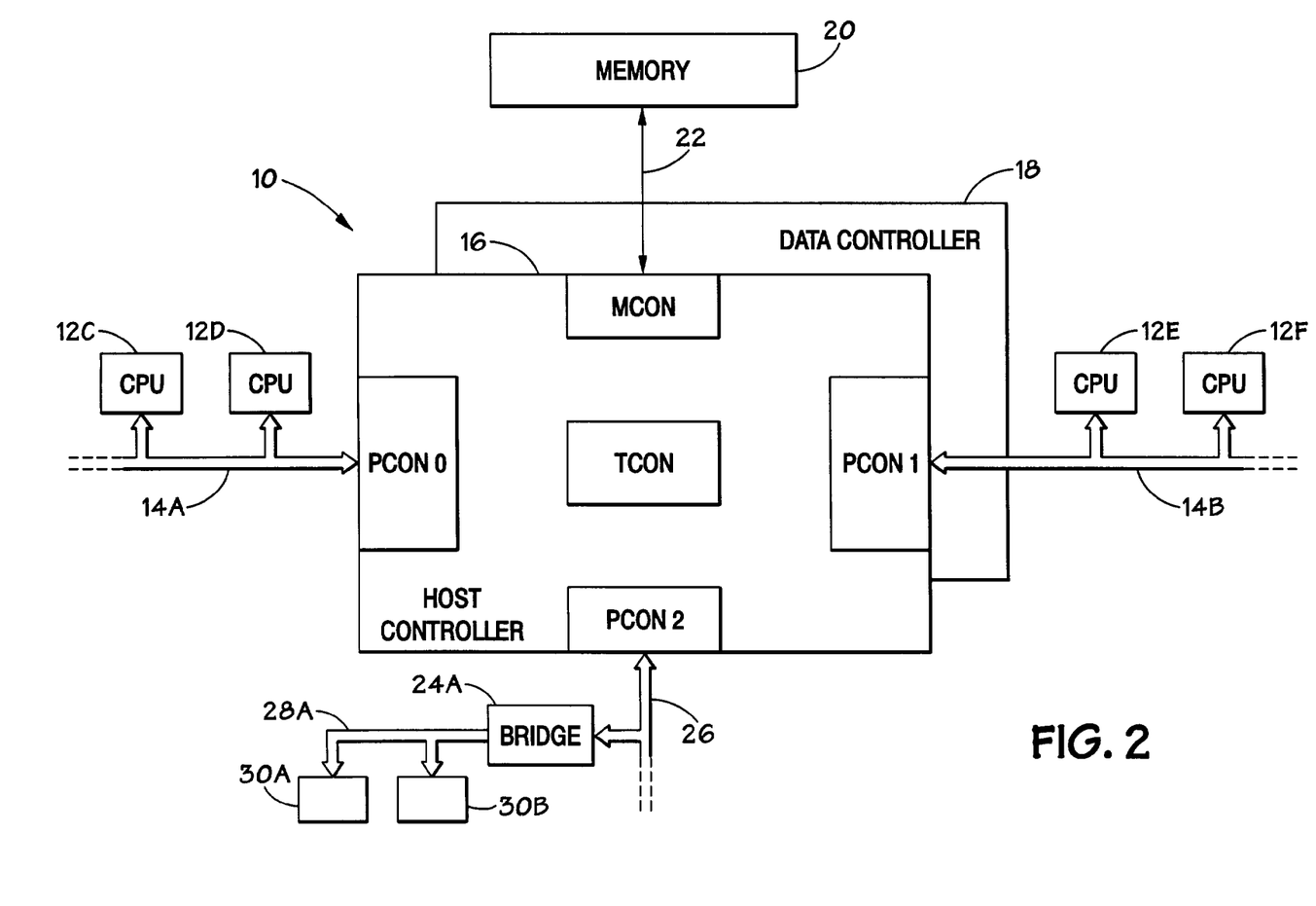
FIG. 2 is a block diagram illustrating an exemplary host controller in accordance with embodiments of the present invention.

FIG. 2 illustrates a block diagram of the host/data controller 16, 18. As can be appreciated, each of the components illustrated and described with reference to the host controller 16 may have a corresponding companion component in the data controller 18. The functionality of each component may be described generally with respect to the host controller 16, which may be configured to receive requests and to coordinate the exchange of requested data through the data controller 18. The host controller 16 generally coordinates the exchange of requests and data from the processor buses 14A and 14B, the I/O bus 26, and the memory bus 22.

The host controller 16 may include a memory controller MCON that facilitates communication with the memory 20. The host controller 16 may also include a processor controller PCON for each of the processor and I/O buses 14A, 14B, and 26. For simplicity, the processor controller corresponding to the processor bus 14A is designated as "PCON 0." The processor controller corresponding to the processor bus 14B is designated as "PCON 1." The processor controller corresponding to the I/O bus 26 is designated as "PCON2." Each processor controller PCON0–PCON2 may connect a respective bus that is external to the host controller 16 (i.e., processor bus 14A and 14B and I/O bus 26), to the internal blocks of the host controller 16. Thus, the processor controllers PCON0–PCON2 facilitate the interface between the host controller 16 and each of the buses 14A, 14B, and 26. Further, in an alternate embodiment, a single processor controller PCON may serve as the interface for all of the system buses 14A, 14B, and 26. The processor controllers PCON0–PCON2 may be referred to collectively as "PCON." Any number of specific designs for the processor controller PCON and the memory controller MCON may be implemented in conjunction with the techniques described herein, as can be appreciated by those skilled in the art.

The host controller 16 may also include a tag controller TCON. The tag controller TCON maintains coherency and request cycle ordering in the system 10. "Cache coherence" refers to a protocol for managing the caches in a multiprocessor system so the data is not lost or overwritten before the data is transferred from the cache to a requesting or target device. Because frequently accessed data may be stored in the cache memory, a requesting agent should be able to identity which area of the memory (cache or non-cache) should be accessed to retrieve the requested information as efficiently as possible. A "tag RAM" (not shown) may be provided in the host controller 16, for example, to identify which data from the main memory is currently stored in each processor cache associated with each memory segment. The tag RAM provides a directory to the data stored in the processor caches. The tag controller TCON maintains coherency in cycle ordering and controls access to the tag RAM. Any number of specific designs for a tag controller TCON for maintaining coherency may be implemented in conjunction with the techniques described herein, as can be appreciated by those skilled in the art.

In some systems, the processor controller PCON may deliver the read request to the tag controller TCON to determine whether the requested data is currently stored in the more rapidly accessible cache memory. If the requested data is not found in the cache memory, the tag controller TCON sends a response to the processor controller PCON indicating that the requested data was not found in the tag RAM. If the requested data was not found in the tag RAM, the processor controller PCON delivers the read request to the memory controller MCON, and the memory controller MCON retrieves the data from the main memory 20.

During a typical read operation, a requesting device, such as the CPU 12D or the peripheral device 30A, for example, may initiate read requests to the host controller 16. The respective processor controller PCON sends the request to each of the memory controller MCON and the tag controller TCON. The memory controller MCON passes the request to the memory 20 to obtain the requested data. Concurrently, the tag controller TCON may send a tag look-up request to the tag RAM to determine whether the requested data is currently stored in one of the processor caches. Generally speaking, if the address corresponding to the requested data is found in the tag RAM and the data is valid (unmodified) data, the request to the memory 20, which generally takes longer to access as previously described, is cancelled and the data is retrieved from the cache memory.

Generally speaking, concurrent initiation of the read request to each of the memory controller MCON and the tag controller TCON improves request processing cycle time. Because most of the requested data will eventually have to be retrieved from the memory 20, concurrent initiation of the read requests from the processor controller PCON to each of the tag controller TCON and the memory controller MCON advantageously reduces the latency associated with serially sending the requests (i.e., sending the request from the processor controller PCON to the tag controller TCON and waiting for a response before sending the request from the processor controller PCON to the memory controller MCON). However, as can be appreciated, some of the read requests issued from the memory controller MCON to the memory 20 may ultimately be unnecessary since the requested data may be found in the more rapidly accessible cache memory.

As can be appreciated, each processor controller PCON may include an associated queue structure to track the read requests issued from the processor controller PCON to the memory controller MCON (and ultimately the memory 20). The queue structure generally includes a discreet number of storage locations or "entrypoints" that are used to store transaction IDs for active requests. Active requests generally refer to those requests that have been delivered from the processor controller PCON to the memory controller MCON. The request remains active until the requested data is returned from the memory 20 to the memory controller MCON. Once the requested data is delivered to the memory controller MCON in the host controller 16, the entrypoint in the queue structure of the processor controller PCON is freed for use by a subsequent request. If the depth of the read queue structure in the processor controller PCON is sixteen, for example, transaction IDs corresponding to sixteen active requests can be tracked, simultaneously. In the present example, if a seventeenth request is received at the processor controller PCON, the processor controller PCON waits until one of the queue entrypoints is freed before sending the request to the memory controller MCON. As can be appreciated, the limited number of entrypoints in the read queue structure may create a bottleneck for request processing.

As previously described, a number of transaction IDs corresponding to read requests stored in the read queue structure may hold transaction IDs corresponding to requested data that will ultimately be discarded since it may be retrieved from the cache memory instead. Because the read request remains active until the requested data is actually sent from the memory 20 to the memory controller MCON in the host controller 16, the associated entrypoint in the read queue structure is reserved until the data is returned. For those transaction IDs associated with read requests whose data is not ultimately retrieved from the memory 20 (e.g., the data can be retrieved from cache memory), the entrypoint in the read queue structure is unnecessarily reserved until the requested data is returned from the memory 20. That is to say that by concurrently delivering the request from the processor controller PCON to the tag controller TCON and the memory controller MCON, a number of entrypoints in the read queue structure will remain reserved even if the transactions in the queue structure are ultimately not used (i.e., correspond to requested data that is retrieved from the cache memory rather than the memory 20). Therefore, it may be advantageous to provide a mechanism for reusing entrypoints for transaction IDs corresponding to read requests that will actually be completed without using data retrieved from the memory 20.

Figure 3:
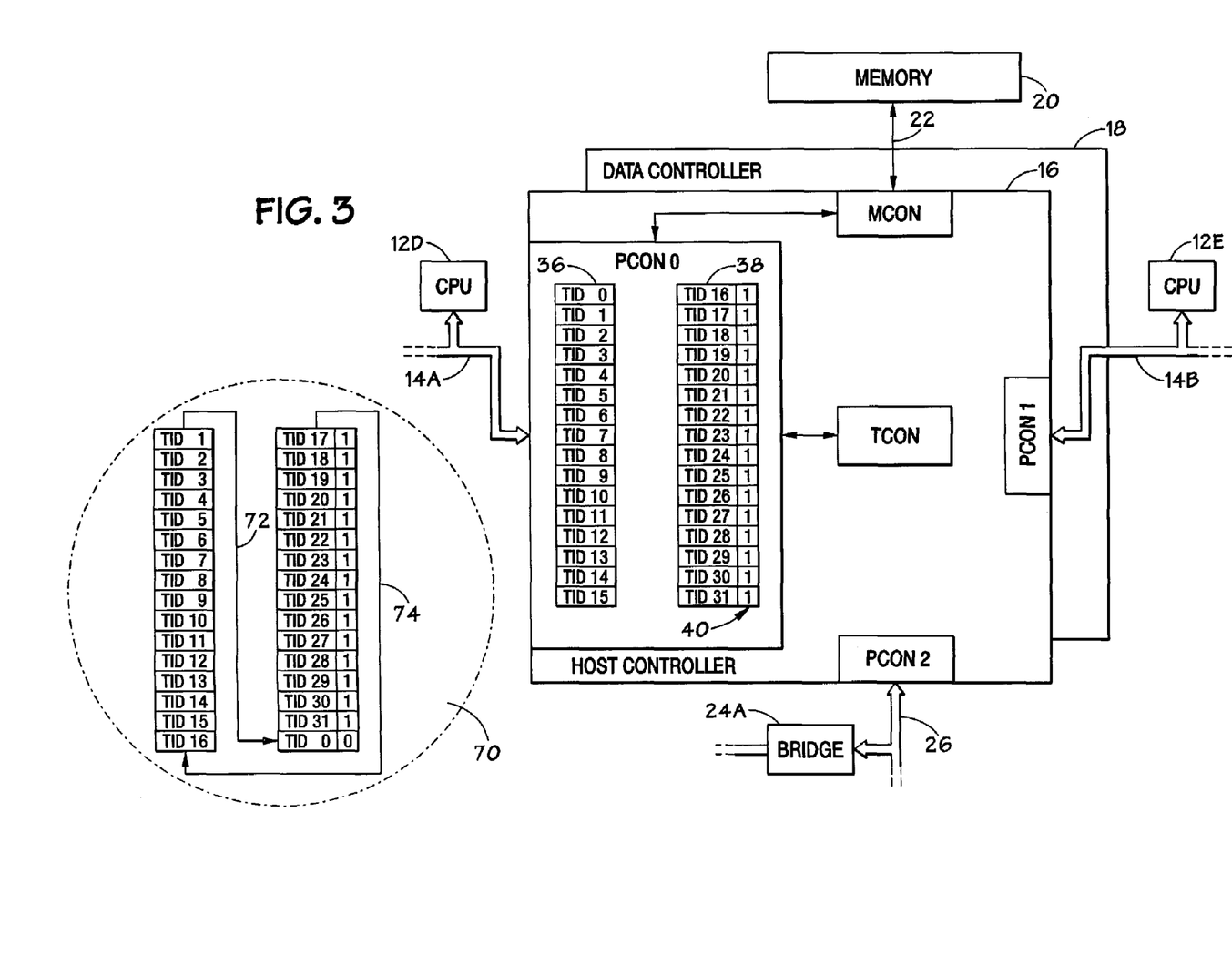
FIG. 3 is a block diagram illustrating an exemplary host controller having queue structures in accordance with embodiments of the present invention.

FIG. 3 illustrates a block diagram of an exemplary host controller in accordance with the embodiments of the present invention, wherein a technique for improved transaction processing may be implemented. In this embodiment, each processor controller PCON implements a dropped queue structure in addition to the read queue structure that allows already issued read requests which are ultimately discarded to be moved to a separate queue (the dropped queue) while awaiting completion of the unnecessary transaction. This technique improves request processing speed and overall system efficiency by reducing the number of requests which may be deferred if the read queue is full and includes transaction IDs corresponding to requests that will not be retrieved from the memory 20.

Referring specifically to FIG. 3, a bock diagram of the host controller 16 is illustrated. The processor controller PCON0 includes a read queue structure 36 and a dropped queue structure 38. Each of the read queue structure 36 and the dropped queue structure 38 has a depth of sixteen entrypoints in the present exemplary embodiment. That is to say, each of the read queue structure 36 and the dropped queue structure 38 includes sixteen entrypoints. As can be appreciated, the depths of the read queue structure 36 and the dropped queue structure 38 may vary depending on the system architecture. Accordingly, to accommodate the identification of each unique entrypoint according to the depth of the read queue structure 36 and the dropped queue structure 38, each entrypoint comprises a width of at least X, wherein X is defined by the equation: $2^X$=depth. In the present embodiment, the depth of each queue (i.e., the number of entrypoints in each queue) is equal to sixteen. Accordingly, the width of each entrypoint (X) is at least 4 bits. Further, while the read queue structure 36 and the dropped queue structure 38 are illustrated with respect to processor controller PCON0, each of the alternate processor controllers PCON1 and PCON2 may include similar queue structures. Accordingly, the memory controller MCON may also include a number of queue structures to track transactions received by the memory controller MCON from each of the processor controllers PCON0–PCON2. For the simplicity of this discussion, an exemplary read queue structure 36 and dropped queue structure 38 are illustrated with reference to the processor controller PCON0.

The present exemplary techniques implement the dropped queue structure 38 and an additional bit (i.e., a "reuse bit") for each entrypoint as indicated by reference numeral 40. The read queue structure 36 may include sixteen entrypoints, each corresponding to a transaction ID (TID) 0–15, as illustrated in FIG. 3. As can be appreciated, by adding one additional bit, designated here as reuse bit 40, to the width of each entrypoint, the width of the each entrypoint in the read queue structure 36 and the dropped queue structure 38 is five bits in the present exemplary embodiment. Each entrypoint associated with TID0–15 is configured to receive a request from one of the processors on the processor bus 14A. As can be appreciated, restrictions embedded in the processor protocol generally limit the number of outstanding requests associated with each processor. In the present exemplary embodiment, the processor bus 14 associated with the processor controller PCON0 includes four CPUs 12A–12D. Each CPU 12A–12D may, for example, allow for up to four outstanding requests at a time. Accordingly, the read queue structure 36 is configured to receive up to sixteen requests at a time from the processor bus 14A. However, as previously described, one or more of the requests stored in the read queue structure 36 may correspond to a read request whose data from the memory 20 will ultimately be unused. Rather than waiting until the data is returned from memory 20, the entrypoint and corresponding transaction ID can be replaced with one of the entrypoints in the dropped queue structure 38 by implementing the reuse bit 40. An exemplary implementation of the presently described system is described further with reference to FIG. 4.

Figure 4:
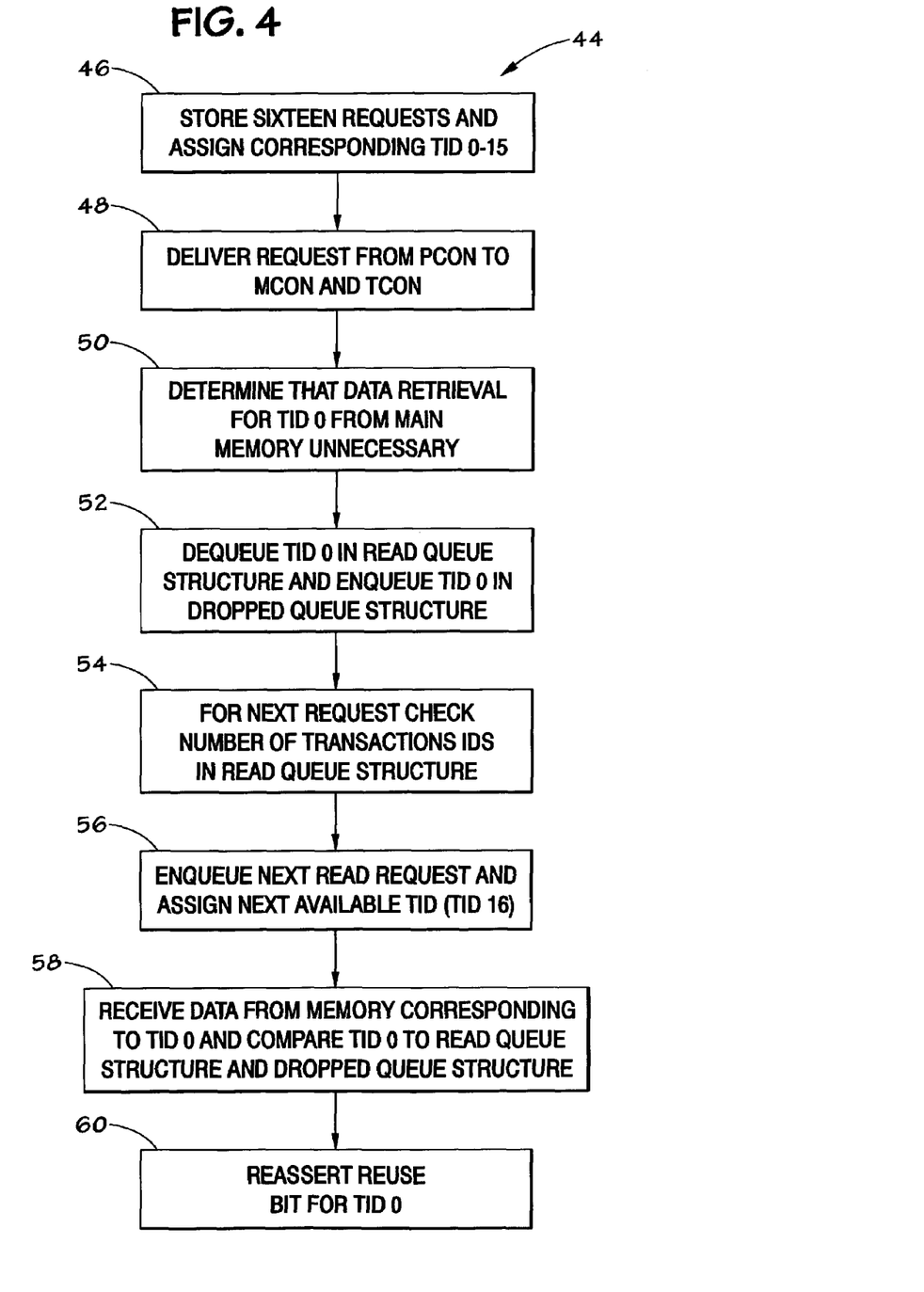
FIG. 4 is a flow chart illustrating a method of processing requests in a computer system in accordance with the embodiments of the present invention.

FIG. 4 is a flow chart illustrating an exemplary technique for processing a request in accordance with an embodiment of the present invention. Accordingly, the description of FIG. 4 should also be viewed with reference to the corresponding block diagram illustrated in FIG. 3. An exemplary process flow is generally illustrated by the flow chart of FIG. 4, generally designated as reference numeral 44. As read requests are delivered from a respective CPU 12A–12D to the processor controller PCON0 via the processor bus 14A, each read request is assigned a corresponding free transaction ID TID0–15. The read request is stored at the corresponding entrypoint of the read request queue 36. Initially in the cycle flow 44 illustrated in FIG. 4, sixteen read requests are stored in the read request queue 36 and assigned a corresponding transaction ID 0–15, as indicated in block 46. As previously described, as each request is stored in the read request queue 36, the read request is delivered from the processor controller PCON0 to each of the memory controller MCON and the tag controller TCON, as indicated in block 48. Because of the time associated with retrieving data from the memory 20, the processor controller PCON0 will receive a response from the tag controller TCON before the data can be retrieved from the memory 20. The response from the tag controller TCON generally indicates whether the data can be retrieved from cache memory. For most transactions, the tag controller TCON will deliver a response to the processor controller PCON0 indicating that the requested data was not found. For these read requests, the data that will eventually be delivered from the memory 20 will be used. As previously described, for these transactions, it is advantageous to send the read requests from the processor controller PCON0 to each of the memory controller MCON and a tag controller TCON simultaneously since the overall cycle time for processing the request and retrieving data from the memory 20 will be reduced.

Because the transaction ID (TID) for the corresponding request stored in the read queue structure 36 will not be released for reuse by a subsequent read request until the corresponding data is retrieved from the memory 20, for those requests whose data can be retrieved quickly from cache memory, holding the corresponding transaction ID until the data is delivered from the memory 20 may disadvantageously slow system performance, as previously discussed. Because the processor controller PCON0 generally receives a response from the tag controller TCON indicating whether the data can be retrieved from cache memory and, thus, whether the data currently being retrieved from memory for the corresponding request is even used, the processor controller PCON0 determines whether the data being retrieved from the memory 20 corresponding to the request will be used before the data is actually delivered to the host/data controller 16, 18.

The processor controller PCON0 can use this information received from the tag controller TCON in advance of the data retrieved from the memory 20 for the corresponding read request and replace the occupied transaction ID with an unused transaction ID from the read drop queue 38. For example, if a processor controller PCON0 receives a response from the tag controller TCON indicating that the read request stored in the entrypoint associated with TID0 can be processed without the data from the memory 20, the read request remaining in TID0 continues to occupy one of the entrypoints unnecessarily until the data is delivered from the memory 20. The tag controller TCON may illicit any number of responses which indicate that the data being retrieved from the memory 20 is unnecessary and can instead be retrieved from the cache memory, as can be appreciated by those skilled in the art. Generically, in the present example, the tag controller TCON delivers a response to the processor controller PCON0 indicating that data retrieval from the memory 20 for the request corresponding to TID0 is unnecessary, as indicated in block 50 of FIG. 4.

To improve overall performance of the host controller 16, once the processor controller PCON receives the response from the tag controller TCON indicating that the read request corresponding to TID0 does not require retrieval of data from memory 20, the processor controller PCON dequeues TID0 from the read queue structure 36. That is to say, a reuse bit 40 is de-asserted, in this example, for TID0 and the request associated with TID0 is moved to the dropped queue structure 38 as indicated in the exploded view 70 of the queue structures illustrated in FIG. 3 and indicator arrow 72. By de-asserting the reuse bit 40 for TID0, the entrypoint corresponding to TID0 will not be refilled until the reuse bit 40 is asserted. For the present example, the reuse bit 40 for TID0 will not be reasserted until the data corresponding to the read request in TID0 is returned from the memory 20.

At this point, there are now only fifteen transaction IDs (TID1–15) in the read queue structure 36. Because the read queue structure 36 is configured to store sixteen requests simultaneously, a transaction ID TID16 may be moved from the dropped queue structure 38 to the read queue structure 36, as indicated by indicator arrow 74 of FIG. 3. The step of dequeuing TID0 in the read queue structure 36 and enqueuing TID0 on the dropped queue structure 38 is indicated in block 52 of FIG. 4.

When the next incoming read request is delivered from the processor bus 14A to the processor controller PCON0, the processor controller PCON0 checks the read queue structure 36 to see how many transaction IDs are present, as indicated in block 54 of FIG. 4. In the present exemplary embodiment, there are currently only fifteen transaction IDs (TID 1–15) present in the read queue structure 36. Accordingly, the read queue structure 36 actually has room for an additional transaction ID. The processor controller PCON0 enqueues the read request and assigns it to the next available reuseable TID. In the present exemplary embodiment, the next reuseable TID is TID16 as indicated by the assertion of the reused bit 40 in FIG. 3. Accordingly, the processor controller PCON enqueues the next read request and assigns it to the reuseable TID16, as illustrated in block 56 of FIG. 4 and indicator arrow 74 of FIG. 3.

Once the memory subsystem 20 returns the data corresponding to TID0, the processor controller PCON0 compares TID0 to the read queue structure 36 and the dropped queue structure 38, as indicated in block 58. Because the request stored in TID0 has been moved from the read queue structure 36 to the dropped queue structure 38, the processor controller discards the data retrieved from the memory 20. Finally, once the data has been retrieved from the memory 20, the processor controller PCON reasserts the reuse bit 40 to indicate that the associated transaction ID (here TID0) can now be reused as indicated by block 60.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of processing requests comprising the acts of:
checking each of a plurality of read requests stored in a read queue structure, wherein each of the plurality of read requests comprises a corresponding transaction identification number;
determining whether any of the plurality of read requests can be completed without accessing a main memory;
if any of the plurality of read requests can be completed without accessing the main memory, moving the corresponding read request to a dropped queue structure, wherein the act of moving the corresponding read request to the dropped queue structure comprises the act of de-asserting a reuse bit; and
for each of the plurality of read requests that can be completed without accessing the main memory, providing an entrypoint in the dropped queue structure to receive a subsequent read request, wherein each of the entrypoints in the dropped queue comprises a transaction identification number.

2. The method, as set forth in claim 1, wherein the act of determining comprises the act of determining whether data from any of the plurality of read requests can be retrieved from cache memory.

3. The method, as set forth in claim 1, comprising the act of when any of the plurality of read requests that are moved from the read queue structure to the dropped queue structure are completed, asserting the reuse bit.

4. A method of processing requests comprising the acts of:
checking each of a plurality of read requests stored in a read queue structure, wherein each of the plurality of read requests comprises a corresponding transaction identification number;
determining whether any of the plurality of read requests can be completed without accessing a main memory;
if any of the plurality of read requests can be completed without accessing the main memory, moving the corresponding read request to a dropped queue structure; and
for each of the plurality of read requests that can be completed without accessing the main memory, providing an entrypoint in the dropped queue structure to receive a subsequent read request, wherein each of the entrypoints in the dropped queue comprises a transaction identification number, wherein the act of providing the entrypoint in the dropped queue structure comprises the acts of:
receiving a subsequent read request;
storing the subsequent read request in the dropped queue structure;
assigning the subsequent read request a transaction identification number from the dropped queue structure; and
moving the assigned transaction identification number from the dropped queue structure to the read queue structure.

5. The method, as set forth in claim 4, wherein the act of determining comprises the act of determining whether data from any of the plurality of read requests can be retrieved from cache memory.

6. The method, as set forth in claim 4, wherein the act of moving the corresponding read request to the dropped queue structure comprises the act of de-asserting a reuse bit.

7. The method, as set forth in claim 6, comprising the act of when any of the plurality of read requests that are moved from the read queue structure to the dropped queue structure are completed, asserting the reuse bit.

8. A method of processing requests comprising the acts of:
storing a plurality of read requests in a read queue structure, such that the read queue structure is full;
assigning a transaction identification number corresponding to each of the plurality of read requests in the read queue structure;
determining that at least one of the plurality of read requests can be completed without retrieving data corresponding to the at least one of the plurality of read requests from main memory;
dequeuing the transaction identification number corresponding to the at least one of the plurality of read requests from the read queue structure;
enqueuing the transaction identification number corresponding to the at least one of the plurality of read requests into a dropped queue structure, wherein enqueuing the transaction identification number comprises de-asserting a reuse bit in the corresponding transaction identification number; and
enqueuing a subsequent read request into the read queue structure.

9. The method, as set forth in claim 8, wherein the act of determining comprises the act of determining whether data from any of the plurality of read requests can be retrieved from cache memory.

10. The method, as set forth in claim 8, wherein the act of storing comprises the act of storing sixteen read requests in the read queue structure.

11. The method, as set forth in claim 8, comprising the acts of:
retrieving the data corresponding to the at least one of the plurality of read requests from main memory; and
asserting the reuse bit in the corresponding transaction identification number.

12. A controller comprising:
a read queue structure comprising a plurality of first entrypoints, wherein each of the plurality of first entrypoints is configured to store a respective read request corresponding to requested data, and wherein each respective read request corresponds to one of a first type, wherein the corresponding requested data may be retrieved only from main memory, and a second type, wherein the corresponding requested data may be retrieved from a memory other than main memory; and
a dropped queue structure comprising a plurality of second entrypoints, wherein each of the plurality of second entrypoints is configured to store a respective read request corresponding to requested data when each of the plurality of first entrypoints contains a respective read request and at least one of the read requests stored in the respective first entrypoint comprises the second type of read request, and wherein each of the plurality of second entrypoints comprises a reuse bit that is configured to be asserted when the corresponding second entrypoint can be used to store a new read request.

13. The controller, as set forth in claim 12, wherein the read queue structure comprises sixteen entrypoints.

14. The controller, as set forth in claim 12, wherein the dropped queue structure comprises sixteen entrypoints.

15. The controller, as set forth in claim 12, wherein each of the plurality of second entrypoints comprises a width of five bits and wherein one of the bits corresponds to the reuse bit that is configured to be asserted when the corresponding second entrypoint can be used to store a new read request.

16. The controller, as set forth in claim 12, wherein the second type of read request comprises a read request having corresponding requested data that may be retrieved from a cache memory.

17. A system comprising:
a plurality of processors;
a main memory operably coupled to the plurality of processors and configured to store data; and
a host controller operably coupled between each of the plurality of processors and the main memory and comprising:
a read queue structure comprising a plurality of first entrypoints, wherein each of the plurality of first entrypoints is configured to store a respective read request corresponding to requested data, and wherein each respective read request corresponds to one of a first type, wherein the corresponding requested data may be retrieved only from main memory, and a second type, wherein the corresponding requested data may be retrieved from a memory other than main memory; and a dropped queue structure comprising a plurality of second entrypoints, wherein each of the plurality of second entrypoints is configured to store a respective read request corresponding to requested data when each of the plurality of first entrypoints contains a respective read request and at least one of the read requests stored in the respective first entrypoint comprises the second type of read request, and wherein each of the plurality of second entrypoints comprises a reuse bit that is configured to be asserted when the corresponding second entrypoint can be used to store a new read request.

18. The system, as set forth in claim 17, comprising:

a first processor bus having one or more of the plurality of processors coupled thereto;

a second processor bus having a different one or more of the plurality of processors coupled thereto; and wherein the host controller comprises a first processor controller coupled to the first processor bus and a second processor controller coupled to the second processor bus, wherein each of the first and second processor controllers comprises each of a respective read queue structure and a respective dropped queue structure.

19. The system, as set forth in claim 17, comprising:

an input/output bus;

one or more input/output devices coupled to the host controller via the input/output bus;

wherein the host controller comprises a first processor controller coupled to the input/output bus and wherein the first processor controller comprises each of a read queue structure and a dropped queue structure.

20. The system, as set forth in claim 17, comprising cache memory and wherein the host controller comprises:

a memory controller configured to coordinate the exchange of data between the host controller and the main memory;

a tag controller configured to determine whether a read request comprises the first type or the second type; and one or more processor controllers configured to coordinate the exchange of data between the host controller and one of an input/output device and one of the plurality of processors.

21. The system, as set forth in claim 17, wherein the plurality of second entrypoints comprises sixteen entrypoints, wherein each of the plurality of second entrypoints comprises a width of five bits, and wherein one of the bits in each of the second entrypoints corresponds to the reuse bit that is configured to be asserted when the corresponding second entrypoint can be used to store a new read request.

* * * * *